LOCATING INFORMATION

Filed May 20, 1954 3 Sheets-Sheet 1

INVENTOR
John L. Hill
BY
Cushman, Darby + Cushman
ATTORNEYS

Jan. 24, 1961 J. L. HILL 2,969,525
LOCATING INFORMATION
Filed May 20, 1954 3 Sheets-Sheet 2

INVENTOR
John L. Hill

BY Cushman, Darby & Cushman
ATTORNEYS

Jan. 24, 1961

J. L. HILL

LOCATING INFORMATION 2,969,525

Filed May 20, 1954

3 Sheets-Sheet 3

INVENTOR

John L. Hill

BY

Cushman, Darby & Cushman ATTORNEYS

United States Patent Office 2,969,525

Patented Jan. 24, 1961

2,969,525

LOCATING INFORMATION

John L. Hill, North St. Paul, Minn., assignor to Remington Rand Inc., New York, N.Y., a corporation of Delaware Filed May 20, 1954, Ser. No. 431,108

14 Claims. (Cl. 340—174.1)

This invention relates to methods and apparatus for storing and reproducing information or the like. The invention is best illustrated in connection with magnetic recording on the surface of synchronously rotating drums, and the following explanation will proceed in regard thereto. However, the invention is equally applicable to non-magnetic recording and may utilize drums, disks, endless tapes or reeled up tapes as the recording medium.

In U.S. Patent No. 2,540,654 issued February 6, 1951, to A. A. Cohen et al., there is described apparatus for recording magnetic spots or cells on the surface of an elongated magnetizable member which is adapted to be moved continuously in relation to various magnetic transducing heads. In a specific embodiment therein disclosed, the magnetizable surface is in the form of magnetic tape which is wrapped tightly about the periphery of a rotatable drum. The patent describes how so-called binary magnetic spots, that is, spots having flux oriented in one of two possible directions, may be recorded upon, removed from, and altered in the message or intelligence tracks of the drum. It is also explained how a series of flux notation of the same character may be blended into one another to form a continuous flux field in one direction. This has been referred to as non-return-to-zero recording. However, so-called return-to-zero recording may be employed, wherein the spots of flux are discrete even if a series of spots along a track happen to be of the same character.

Various techniques for locating specific cells or areas in the intelligence tracks for a reading, recording or selective alteration operation have been described in the above mentioned Patent 2,540,654 and in improvements thereon; for instance, U.S. Patent No. 2,614,169 issued October 14, 1952, to A.A. Cohen et al.; application of A. P. Hendrickson et al. filed December 30, 1950, Serial No. 203,612, now U.S. Patent No. 2,771,595, issued November 20, 1956; and application of H. L. Daniels et al. filed February 26, 1952, Serial No. 273,490, now U.S. Patent No. 2,680,239, issued June 1, 1954. In each of these patents and applications, the locating techniques described require the use of address or identifying information in additional tracks and/or memory devices.

This invention is based upon the techniques described in the above-cited Patent 2,540,654 and relates in particular to the use of such techniques for the storage of messages of more or less uniform length or lengths. The techniques described in connection with this invention disclose means for locating a specific message by utilizing a unique identifying criterion forming an integral part thereof, which criterion may be either an inherent portion of such message or supplied thereto for locating purposes. This disclosure demonstrates how such messages may be arranged on the surface of the drum to allow the location of a specific message in a minimum of time, while retaining economy in the amount of circuitry and number of additional drum tracks required. Since the criterion will ordinarily be a fundamental element of the message, as where account entries are recorded with the customer's name or where time of aircraft departure is reserved by plane or flight number, no decrease in storage capacity of the message tracks is involved.

It is accordingly an object of this invention to provide an improved system for storing messages on the surface of a cyclically moving record member.

It is a further object of the invention to provide methods and apparatus for locating specific messages on the surface of a record member.

Further objects and advantages of the invention will be apparent from the following description and accompanying drawings, in which.

Figure 1:
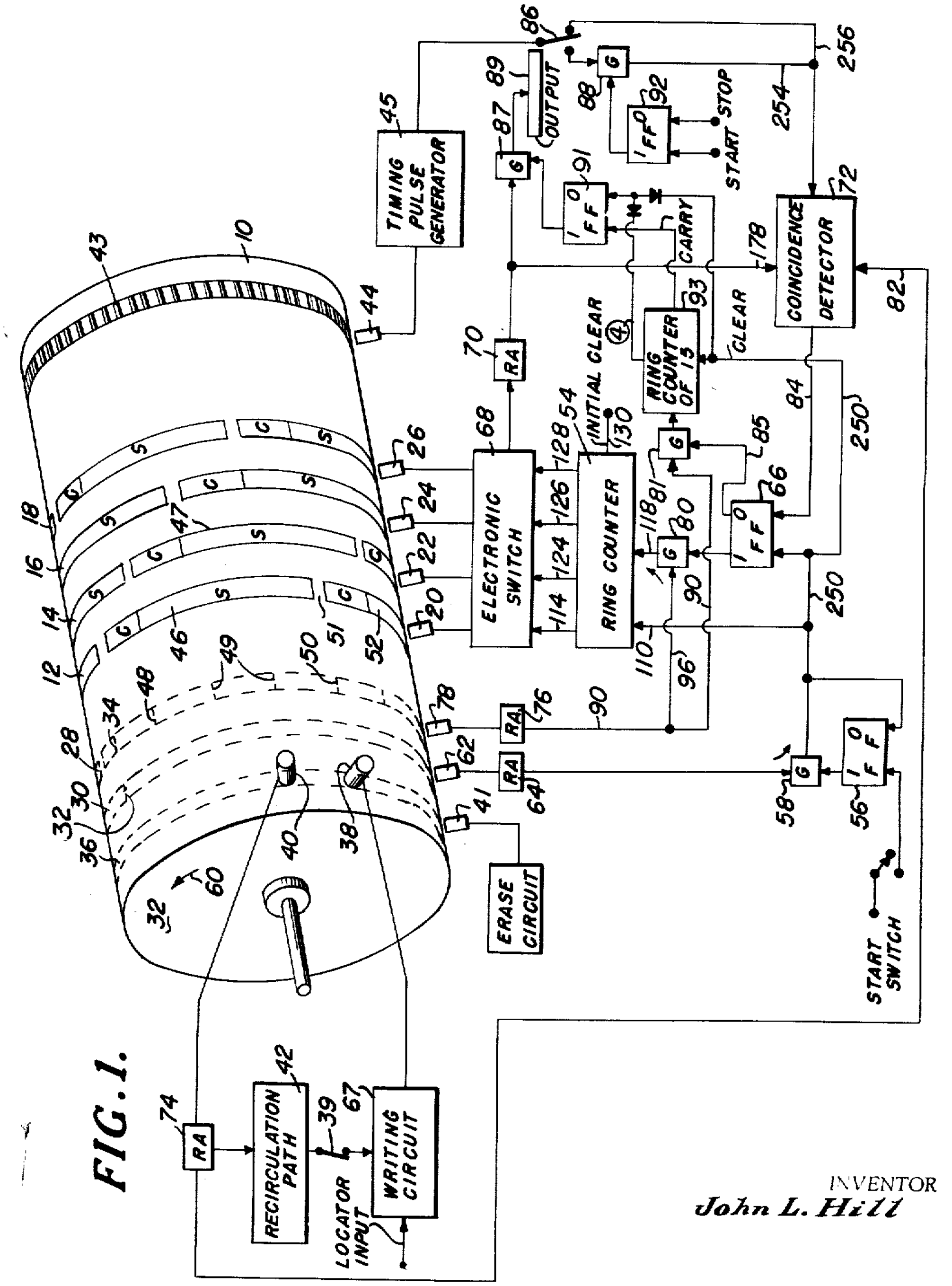
Figure 1 is a diagrammatic layout of the invention.

Referring now to Figure 1, showing exemplary structure, the numeral 10 designates a movable record member comprising a drum having a magnetizable surface. Recorded on message tracks 12, 14, 16 and 18 on the drum are a series of data groups, information or messages, each of which contains a unique identifying portion or criterion, designated in the drawing as C, followed by satellite information designate S. The tracks 12, 14, 16 and 18 comprise one block of message tracks. It will be understood that the identifying criterion can be part of the data group if desired. In practice there would ordinarily be a great many blocks of tracks. While the criteria of the messages need not be uniform, the space reserved therefor in each message must be constant. The messages may be coded in ordinary 5-unit Teletype code and recorded serially in a continued string of cells or characters along a single track of the drum with the fifth bit of each character immediately preceding the first bit of the next character. Recording may be accomplished by means of writing windings on transducers 20, 22, 24 and 26 positioned adjacent the message tracks. Means for recording are described in the above-cited Cohen et al. Patent 2,540,654.

Three drum tracks are provided for control purposes. Track 28 contains a series of permanently recorded criterion marks, equally spaced by exactly the number of cell or character spaces reserved for the criterion of a message. The second control track 30 contains a single, permanently recorded reference mark 32 which is aligned with one of the criterion marks 34. When alignment of marks or cells between two different tracks is considered, this is not necessarily meant to indicate physical alignment, because the close spacing of adjacent tracks may require that the relatively large transducing heads be arranged helically around the drum as shown in the above-mentioned Cohen et al. Patent 2,540,654 or otherwise staggered about the periphery of the drum. Therefore, the marks, cells and/or characters will be considered according to their "electrical" alignment and are so depicted to the drawing.

The third control track is revolver track 36 with which is associated a writing or recording transducer 38, a reading transducer 40 and an erase head 41. Pulses recorded on track 36 through writing transducer 38 are played back by reading transducer 40 after the drum rotates through a distance equal to that between adjacent criterion marks on track 28. The pulses are immediately rewritten on track 36 and so are kept in continuous recirculation until the recirculation path 42 is interrupted by switch 39. The elements operative in the recirculation of these pulses will be referred to as the revolver means. In capacity operation, the total number of pulses which may be accepted by the revolver means is that number which will just fill the space on track 36 between the transducers 38 and 40. In other words, the identifying criterion C of any message stored on the drum may be recirculated by the revolver means. The criterion in the revolver may be conveniently termed the locator criterion. If the first character of the locator criterion is initially aligned with a criterion mark, each recirculation of the locator criterion will align that character with the next criterion mark.

The drum is also provided with a timing track 43 which cooperates with transducer 44 and timing pulse generator 45 to produce a continuous train of sharp pulses in a manner described in Cohen et al. Patent 2,540,654. These timing pulses are used for general synchronizing purposes, particularly in controlling the recording of digital information on the drum.

In the initial recording of messages on the drum, the first message 46 is recorded on message track 12 with the first character of the identifying criterion C of the message 46 aligned with criterion mark 34, the criterion of the first character of the second message 47 is aligned with the next criterion mark 48, etc. It will be apparent then that the identifying criteria are aligned successively or "staggered" across the drum or tape. Actually the first character of each message will be placed slightly trailing in its associated criterion mark to allow for inherent delays in switching operations. In the specific example of Figure 1, it is seen that because message 46 is shorter than the distance between criterion marks 34 and 50, the fifth message 52 may also be recorded on track 12 in alignment with mark 50. The first four messages may be said to be in the first, second, third and fourth criterion phases and together comprise the first sector or section of the drum or tape. In the specific example of Figure 1, the drum contains four sectors. When all four sectors of message tracks 12, 14, 16 and 18 are filled, subsequent messages are recorded in other blocks (not shown) of data tracks with the first character of the first message in each block aligned with criterion mark 34.

If the drum of Figure 1 is ten inches in diameter and the cells are positioned eighty to the inch circumferentially, each message can contain about 125 five-unit Teletype characters. If shorter messages are to be stored, there may be more than four sectors, and if the identifying criterion is also a smaller fraction of the message, more than four tracks may be used per block. It will be appreciated that different blocks of message tracks on the drum may contain different numbers of tracks and sectors according to the make-up of the messages to be stored therein. However, the space reserved for the identifying criterion in every message must be the same or a separate set of control tracks and revolver lengths would be needed for each set of messages which has a different criterion length.

In order to search the contents of the drum for a message having a specified or unique identifying criterion, it is first necessary to ascertain that same identifying criterion for use in, and for insertion into, the revolver means serially in the same fashion as the identifying criterion characters appear in the message tracks and to gate the ascertainment of the "locator" criterion so that the first character thereof, when recorded on revolver track 36, is aligned with one of the criterion marks of track 28. (For purposes hereinafter more apparent, the identifying criterion when inserted into the revolver circuit is termed the locator criterion, although the two criteria may be the same in character.) A suitable method for loading revolver track 36 by transducer means 38 is explained in the above-mentioned Cohen et al. Patent 2,540,654, and the Cohen et al. Patent 2,614,-169 provides a method of loading the revolver circuit serially from slow incoming telegraphic means. Another and more efficient method could involve the use of one or more "assembly" revolvers (not shown) which may also be loaded at relatively slow rates, as for example from telegraphic lines, during preceding searches. The locator criterion in such an assembly revolver may then be transferred to revolver track 36 in a single "burst," that is, the assembly revolver output being connected directly to the locator input of revolver track 36 so that the criterion is transferred completely in one pass of the drum.

Upon starting the search, it is necessary to clear the ring counter of four 54, if this has not been done previously as hereinafter explained, so that no signals are played back until the search is initiated. A search starting pulse is applied to the "1" input of flip-flop 56 and, to insure clearance, this pulse could also be connected directly to the ring counter clearing line 130. (This connection not shown.)

Proceeding further in the search for the proper identifying criterion, the starting pulse which was applied to the "1" position of flip-flop 56, as mentioned above, enables gate 58. After the drum rotates in a direction 60 through approximately 210° from the position shown in Figure 1, the reference mark 32 on track 30 will induce a voltage in reading transducer 62. This voltage is applied to reading amplifier 64 to produce a pulse which passes through gate 58 to set ring counter 54 to the first position, enabling a voltage on line 114, and at the same time to set flip-flop 66 to its "1" position and reset flip-flop 56. Ring counter 54 sets electronic switch 68 to its first position, permitting voltages induced in the reading winding of transducer 20 to be applied to reading amplifier 70. The identifying criterion C of message 46 will be transmitted from reading amplifier 70 in the form of pulses to coincidence detector 72 where it is compared bit by bit with the locator criterion stored in revolver track 36 as it is played back through reading transducer 40 and reading amplifier 74. If coincidence is not detected, the pulse generated at the output of reading amplifier 76 when criterion mark 48 passes beneath transducer 78 will pass through gate 80, which was previously enabled by flip-flop 66, to stepping ring counter 54 and in turn to electronic switch 68 on line 124, thereby setting ring counter 54, and electronic switch 68 to their second positions. The identifying criterion C of message 47 is then compared bit by bit with the locator criterion in revolver track 36 which arrives on line 82 while it is being recirculated a second time. When coincidence is detected, the coincidence detector 72 will produce an output on line 84 to reset flip-flop 66, disabling gate 80 so that ring counter 54 remains at the same position until cleared for a new search. Until coincidence is detected, the search will proceed to tracks 16 and 18 and then back to track 12 for examination of the identifying criterion of message 52. When all messages in the block of tracks shown in Figure 1 are examined, the search will be switched to the next message block (not shown). Means for detecting the end of the block and switching to the next block are not shown but could be easily provided by one skilled in the electronic art. For example, when reference mark 32 is sensed by transducer 62, the ring counter 54 could be caused to cooperate with an extension of electronic switch 68 comprising a second set of four stages which energize the reading windings in transducers associated with a second block of message tracks essentially duplicates of tracks 12, 14, 16 and 18.

Figures 2, 4:
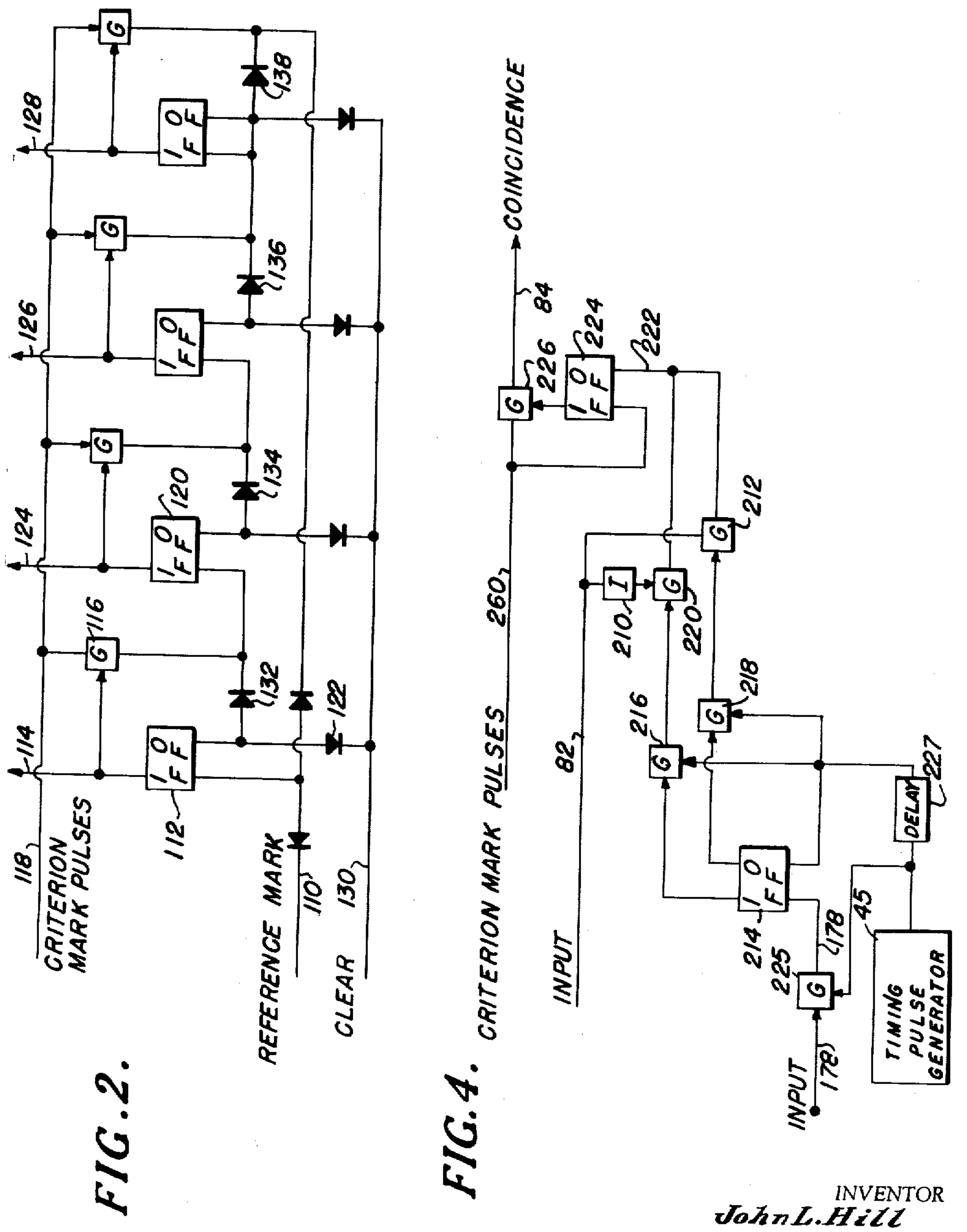
Figure 2 illustrates a ring counter which may be employed in the invention.
Figure 4 shows a coincidence detector circuit used in the invention.

When the message being sought is located, it is gated out, and subsequently ring counter 54 is cleared, and revolver track 36 is erased by interrupting the recirculation path 42 by means shown generally as switch 39 and energizing erase head 41 if the erase is non-continuous. One method of gating out the desired message is shown in Figure 1. As previously explained, detection of coincidence of the complete criterion produces an output on line 84, setting flip-flop 66 to its "0" position. As will be explained below, the coincidence output on line 84 appears before the succeeding criterion mark pulse on line 90 so that gate 80 is disabled to prevent ring counter 54, and consequently electronic switch 68, from being stepped to their next positions until the selected message is gated out. Because the criterion C is generally an integral portion of the message, it is necessary to delay the reading-out operation until the first character of the message again passes beneath the transducer. This is accomplished by counting criterion mark pulses appearing on line 90 after the detection of coincidence has set flip-flop 66 to "0," thereby applying an enabling voltage on line 85 to gate 81. The criterion mark pulses are applied via gate 81 to the step input of a ring counter of fifteen 93 which was initially cleared at the beginning of the search by the reference mark pulse on line 250, which pulse also set flip-flop 91 to "0." The sixteenth criterion mark pulse, which marks the beginning of the criterion C of the selected message, produces a carry pulse from ring counter 93 to set flip-flop 91 to "1." Gate 87 is accordingly enabled to pass signals from the reading amplifier 70 to the output 89 until flip-flop 91 is reset to "0" by the fourth succeeding criterion mark pulse which produces an output from the fourth stage of ring counter 93 as indicated by encircled number 4. The output equipment 89 may, for example, comprise another "assembly" revolver of the type mentioned briefly hereinabove, which may store the information until retransmission (such as over Teletype lines or by electric typewriters or punched-card equipment) can take place. The output 89 can be any of several well known systems, one of which is shown in Figure 4 of the abovementioned Cohen et al. Patent 2,540,654. This patent also specifies means for writing a new message directly over the old, destroying the old message in the process, using so-called return-to-zero recording.

Thus far, only the problem of locating a message with a unique identifying criterion has been discussed. However, it may sometimes be necessary to read out a number of messages having a certain character or characters in common. For convenience, this method will be referred to as the common identifying method in contradistinction to the previously described unique identifying system. For such an operation, means must be incorporated by which only the critical character or characters in each identfiying criterion are compared to the contents of the revolver track 36. A number of suitable methods for limiting the search to certain selected characters are available and could be easily supplied by anyone familiar with the art. Perhaps the most convenient method is to render the coincidence detector 72 inoperative while the unselected portions of the identifying criteria are being played back, by interrupting the flow of timing pulses.

Means for limiting the search to any portion or portions of each identifying criterion are shown in Figure 1. Switch 86, which is ordinarily set in the right-hand position as shown to allow an uninterrupted flow of timing pulses, it thrown to apply those pulses to gate 88. The search is commenced as described above with the identifying criterion C of message 46 applied to coincidence detector 72 in synchronism with the locator criterion as it arrives on line 82. However, gate 88 is controlled from the "1" output of flip-flop 92 to allow timing pulses to pass only at the times at which the selected criteria portions appear at coincidence detector 72. A number of well known methods are available for so controlling gate 88 through flip-flop 92. One convenient method which will suggest itself to those skilled in the art involves the use of two additional drum tracks (not shown), on which "start" and "stop" signals may respectively be recorded at the desired intervals. The reading winding of the transducer positioned adjacent one of these tracks may be connected through a reading amplifier to the "start" input of flip-flop 92 shown in Figure 1, and the other track is correspondingly associated with the "stop" input of flip-flop 92. Marks are then recorded respectively on these tracks to bound the portions of the criteria selected for comparison. It will be appreciated that sixteen marks must be recorded on each of these tracks to test coincidence in a single contiguous group of characters in each criterion, 32 marks in each track for two separate groups, etc. It should be pointed out that marks on the "start" track must be recorded in the cell immediately ahead of the cell which is electrically aligned with the first binary element of the first of a group of criterion characters to be tested, because of the relatively slow transition-time of flip-flop 92 compared to that of gate 82. By the same token, each "stop" mark is electrically aligned with the last binary element of a criterion character.

At this point it should be noted that after the locating and reading out of a message having identifying criterion characters in common with other messages to follow, some means must be provided to continue the search. An obvious method is to hold ring counter 54 and electronic switch 68 in position until the selected message is gated out, and then to continue the search from that point. This however, requires memory means, and a more economical procedure is available. After a selected message is gated out, one of the characters in its identifying criterion C is altered; for example, an extraneous, non-existent or out-of-context character could be written into the first character space of the criterion portion of the gated-out message. This allows the search to begin anew, and since this message no longer satisfies the conditions of coincidence, the search will progress until the next "common" message is encountered. Such a method is, of course, time consuming, but in a practical application the search is very fast relative to input and output functions and the economy of equipment outweighs the time loss.

The operation of the elements shown in block form in Figure 1 will now be briefly described. The flip-flops which are designated as FF may take a number of well known forms. A suitable circuit is shown in Figure 6 of U.S. Patent 2,614,169 issued October 14, 1952, to A. A. Cohen et al. Figure 7 of the same patent is suitable for insertion in the gate blocks, which are designated as G.

In reference to Figure 2, a ring counter of four suitable for use in Figure 1 is shown and comprises flip-flops and gate elements of the same type used in Figure 1 as well as a number of pulse-isolating diodes. If the counter is initially cleared, i.e., all flip-flops set to "0" position, a pulse on line 110, initiated by reference mark 32, sets flip-flop 112 to its "1" position to produce an ouput voltage on line 114 and to enable gate 116. Next a criterion mark pulse on line 118 passes through gate 116 to reset flip-flop 112 and set flip-flop 120 to "1" but is prevented by diode 122 from reaching the "0" side of flip-flop 120. Further pulses on line 118 advances the output position from line 124 to lines 126, 128 and back to line 114. The counter continues to cycle until a coincidence pulse appears on line 84 (Fig. 1) and sets flip-flop 66 to "0," thereby disabling gate 80 and preventing further criterion mark pulses from appearing on the ring counter input line 118. After the message is gated out, the clearing pulse occurs on line 130 and sets all flip-flops in the ring counter 54 to "0." Diodes 132, 134, 136 and 138 prevent the clearing pulse from being applied to the "1" sides of the flip-flops.

As will be apparent to those skilled in the art, the ring counter of fifteen 93 shown in Figure 1 can be identical in construction to the ring counter of four 54 just described and illustrated in Figure 2, except that it will contain fifteen stages rather than four. When a string of pulses are applied via gate 81 to its step input line (corresponding to lines 110 and 118 of Figure 2 which would in this case be electrically connected), the fifteenth pulse would set the flip-flop of the last stage to "1" if the counter was initially cleared. The sixteenth pulse would then pass the enabled gate of the last stage to both produce a carry pulse and set the first stage flip-flop to "1." Three more pulses would set the flip-flop of the fourth stage to "1" so that the fourth pulse would pass the gate enabled by that flip-flop to produce an output on the lead marked by encircled number 4 in Figure 1.

Figure 3:
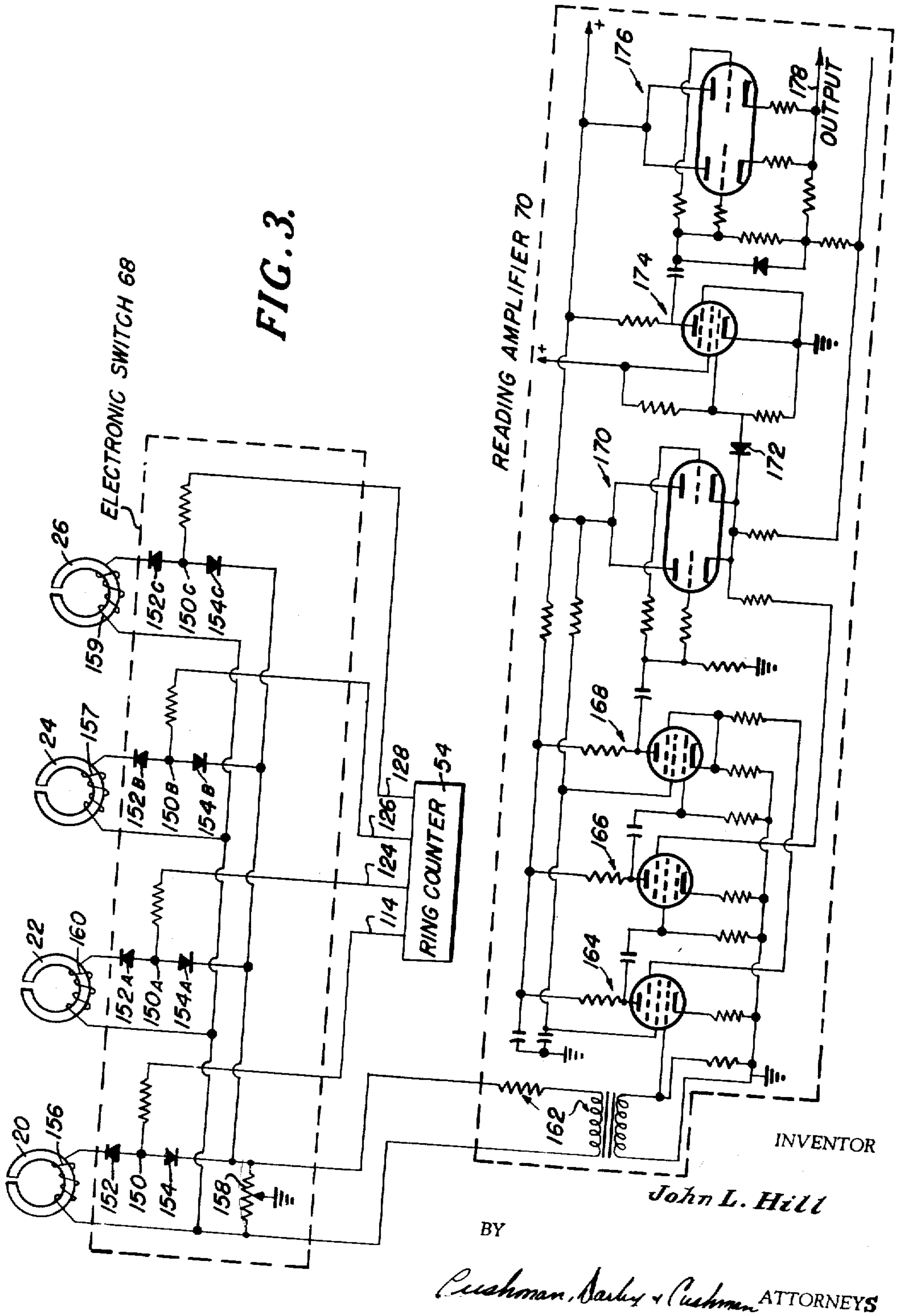
Figure 3 is a schematic drawing of an electronic switch and a reading amplifier employed in the invention.

Figure 3 illustrates an electronic switch and a reading amplifier suitable for use in the practice of this invention. The potentials of all the outputs from the ring counter 54 are chosen so that when it is cleared, the voltage at point 150 (and corresponding points 150*a, b, c*) is sufficiently negative that the diodes 152 and 154 (and corresponding diodes 152*a, b, c* and 154*a, b, c*) present a high impedance to any signal in the reading winding 156 (and corresponding windings 157, 159 and 160) of transducer 20 (and corresponding transducers 24, 26 and 22). The diodes combine with resistor 158 to act as a voltage divider, and since the impedance of the diodes is large compared to that of the resistor, the signals are effectively blocked. When ring counter 54 is switched to the first position, the output on line 114 makes point 150 sufficiently positive that diodes 152 and 154 present a low forward impedance to signals in winding 156 that is small compared to the parallel impedance of resistor 158 and RL circuit 162. When the ring counter is switched to provide an output on line 124 only signals generated in the reading winding 160 of transducer 22 are passed to the reading amplifier while transducers 20, 24 and 26 are effectively blocked.

Signals applied to the reading amplifier are first differentiated by RL circuit 162 and then passed through three stages of amplification 164, 166 and 168. The amplified signal is applied to cathode follower 170, clipping diode 172, pulse shaper 174 and cathode follower 176 to provide a shaped pulse of low impedance on output line 178.

Although the reading amplifier 70 is described in connection with the electronic switch 68, it will function equally as well for reading amplifiers 64, 74 and 76 of Figure 1. However, any one of a number of well known reading amplifiers such as that shown in Figure 11 of U.S. Patent 2,614,169 issued October 14, 1952, to A. A. Cohen et al. may be used in those blocks. A reading amplifier designated as 70 in Figure 1 and shown in detail in Figure 3, is preferably employed at the output of electronic switch 68 because of the high speed switching at its input. The reading amplifier shown in Figure 3 can serve a great number of playback heads and so provides great economy in the circuitry required to practice this invention.

Referring again to Figure 1, signals played back from the message track selected by electronic switch 68 are amplified in reading amplifier 70 to produce pulses on line 178 which are applied to coincidence detector 72. There the pulses are compared bit by bit with the signals appearing at input line 82 while being recirculated on revolver track 36.

The coincidence detector may take one of two general forms. If each criterion is composed of *n* bits of information, each pair of bits may be compared and a modulo-*n* counter advanced with each coincidence. If all *n* pairs of digits coincide, the counter will have attained its limit when the next criterion mark is sensed and the resultant carry pulse on line 84 may be used to stop the search.

However, means for detecting coincidence involving more economical circuitry is shown in block form in Figure 4. This circuit utilizing criterion mark pulses for the coincidence output on line 84, and receiving same on line 260 as shown in Figure 4, comprises gates and flip-flops of the same type suggested for use with Figure 1 and a D.-C. inverter, a number of satisfactory designs for which are well known to those familiar with the art. The inputs to the coincidence detector are interchangeable, but for purposes of example, pulses on line 82 from the revolver are applied to inverter 210 and gate 212 while pulses from the message tracks on line 178 simultaneously set flip-flop 214 through reclocking gate 225. Timing pulse generator 45 supplies a continuous string of clock pulses to reclocking gate 225 which are delayed in time in delay line 227 to be optimumly aligned with digital information arriving on the input lead 82. Since the digital information is represented by a pulse for a "1" and the absence of a pulse for "0," a pulse on line 178 will enable gate 225 while in the absence of a pulse, flip-flop 214 remains at "0" and gate 218 remains enabled. A pulse on line 82 enables gate 212 while the absence of a pulse enables gate 220 through the action of inverter 210. It will be seen that a pulse will occur on line 222 only in the event of anti-coincidence between a pair of bits. A single anti-coincidence sets flip-flop 224 to "0" to disable gate 226. Each criterion mark pulse on line 260 sets flip-flop 224 to its "1" position and if the criteria being compared coincide, the next criterion mark pulse passes through gate 226, which remains enabled by flip-flop 224 not having been reset by a pulse on line 222, to indicate coincidence on line 84, causing the message to be gated out. Referring back to Figure 1, it will be seen that a pulse on line 84 sets flip-flop 66 to "0" to disable gate 80. This must be done to leave the position of electronic switch 68 unchanged until the selected message can be gated out. However, if the pulse is produced on line 84 by means of the next criterion mark pulse as shown in Figure 4, gate 80 will have passed the same pulse to step the ring counter 54 forward. A number of methods for avoiding this difficulty will suggest themselves to those skilled in the art. For example, a short delay could be introduced on line 96, in which case an equal delay would be applied to the reference mark pulses to re-synchronize the criterion and reference mark pulses. A more straightforward method involves the use of an additional control track (not shown) on which is recorded a set of 16 marks corresponding to the 16 criterion marks but electrically aligned so as to precede the criterion marks by a short period. Then by applying the pulses generated from this additional control track via input line 260 to the coincidence detector (Figure 4), a coincidence-indicating output on line 84 will set flip-flop 66 to "0" to disable gate 80 before the next criterion mark pulse arrives.

Although the speed of the drum is not critical, large variations in the speed thereof will cause errors in locating and reading unless all relevant elements in the system are synchronizing by the pulses from the timing track 43. Inherent delays in the electronic system will balance out generally, but where not, delays or timing pulse counters may be inserted to compensate for the unbalance.

It may also be pointed out that flip-flops and gates, as interconnected in Figures 1, 2 and 4, have switching properties such that if a pulse is impressed upon a gate at the same time that a transition of that gate's enabling flip-flop is initiated, the flip-flop state which existed prior to the transition determines whether the gate transmits a pulse. This is so because the transit time of a pulse through a gate is very short relative to the flip-flop transition time. As applied to Figure 4, this means that while the same criterion mark pulse which sets flip-flop 224 is simultaneously applied to gate 226, the gate transmits that pulse only if it was previously enabled by flip-flop 224.

It will be appreciated that in reducing the number of control tracks to a minimum, in providing an almost continuous examination of the message identifying criteria, and yet in using only a single coincidence detecting circuit, this invention provides a method of locating messages combining a maximum of economy without great sacrifice in speed. The successive alignment or staggering of the identifying criteria and consequent continuous sequential reading thereof eliminates the loss in time which would result if the search were discontinued while satellite information passed the transducer associated with the track being searched.

Numerous refinements could be made to achieve greater speed in locating a desired message by performing some functions simultaneously but each would require additional circuit elements with a resultant sacrifice in economy. Many such refinements and variations in the embodiments of the invention could be made without departing from the spirit and scope thereof. Therefore, it is intended that the matter contained in the above description and shown in the accompanying drawings be interpreted as illustrative and not limitative, the scope of the invention being defined in the appended claims.

What is claimed is:

1. In apparatus for locating information including at least partially identifying criterion, said information being recorded in a track along a record member movable in operative relation to information reading transducing means with the identifying criterion thereof and the remainder of said information being recorded serially in the same information track and in the same form for detection, revolver means for circulating information locator criterion, means for operating said revolver means in synchronism with said record member, said revolver means including revolver reading means for reading said locator criterion circulating in said revolver means, and comparison means connected with said information reading transducing means and with the revolver reading means for comparing the identifying criterion read in said information containing track to detect at least partial coincidence between the so-read identifying criterion from the track and the locator criterion from the revolver means, said comparison means including means for producing a signal upon detection of said coincidence.

2. Apparatus as in claim 1 wherein said record member includes a revolver track operative in said revolver means and the revolver reading means comprises a reading transducing means having an output, and wherein said revolver means further comprises recording transducing means having an input, both of the revolver transducing means being positioned to sweep out said revolver track along the record member, and means interconnecting the output of the reading transducing means with the input to the recording transducer means, the reading transducing means being spaced from the recording transducer means a predetermined distance in the direction of record movement, the arrangement being such that said locator criterion when recorded in the revolver track by said revolver recording transducer means is read a predetermined time later and then reapplied to the revolver recording transducer means.

3. Apparatus as in claim 2 wherein the revolver reading means includes means tapped into the means connecting the revolver reading transducing means and the revolver recording transducing means for the delivery of the locator criterion to said comparison means.

4. Apparatus as in claim 1 and further comprising criteria mark reading transducing means positioned to sweep out a control track along the record member, criterion marks being recorded in said control track for synchronizing the locator criterion with said identifying criterion.

5. Apparatus as in claim 1 and further comprising at least a second information containing track substantially parallel to said first-mentioned information containing track, discrete reading transducing means for operation in each additional information track, each additional track containing at least one identifying criterion recorded serially with respect to the remainder of information, if any, in the respective information tracks and in the same form for detection, a control track on the record member and control reading transducing means in operative relation thereto for producing output pulses in response to spaced criterion marks in the control track, the criterion marks being at least electrically aligned with said identifying criterion in the information tracks, and switching means responsive to the output of the control track reading transducing means for successively enabling the reading transducing means of the respective information tracks to read said identifying criteria in the respective information tracks in predetermined sequence.

6. Apparatus as in claim 5 wherein the information tracks each contain two or more sections of information, each section having an identifying criterion at the leading end thereof with respect to record movement, said sections being in staggered relationship lengthwise of the tracks, the arrangement being such that the switching means is effective to cause reading of the identifying criterion in at least two of the different information tracks successively in a time equal to or less than the time required for a complete information section of any one track to pass the reading transducing means of that track.

7. Apparatus as in claim 6 wherein the switching means includes a ring counter responsive to said criterion marks for successively enabling the respective reading transducing means associated with the respective information tracks.

8. Apparatus as in claim 5 wherein the apparatus includes means for receiving an output from an enabled information reading transducing means, means operatively connected with the comparison means whereby a coincidence signal produced by said comparison means establishes a path for the located information to flow from the reading transducing means to the information output receiving means, and includes means for suppressing further successive enablement by the switching means to permit complete reading of the located information.

9. Apparatus as in claim 8 wherein the operatively connected means includes counter means responsive to said criterion marks in the control track for determining the time period that said path is open to the flow of the located information.

10. Apparatus as in claim 9 and further including gating means to provide said path and wherein said counter means is associated with said gating means for control thereof, the arrangement being such that upon occurrence of coincidence the output from the comparison means enables the counter means to begin counting said criterion marks and said counter means thereupon counts a predetermined number of said marks, the time period that said gating means is enabled being at least a portion of the time required for counting said predetermined number of criterion marks.

11. Apparatus as in claim 1 including means for receiving an output from said information reading transducing means, and means connected with the comparison means and responsive to an output signal thereof indicating detection of coincidence, for establishing a path for located information to flow from the reading transducing means to said information output receiving means.

12. In apparatus for locating information recorded in a section in at least one of a plurality of information tracks extending along a record member, each track containing a plurality of recorded sections of information, each section of information including discrete identifying criterion differing from the identifying criterion of other information sections to a predetermined extent, revolver means for circulating information locator criterion intended to coincide with at least a portion of at least one identifying criterion of the said information sections, means for operating said revolver means in synchronism with said record member both as to rate of movement and to position of portions of the record member with respect to the identifying criterion in the information tracks, means for reading said locator criterion circulating in said revolver circuit, coincidence detector means having first and second inputs, one input being connected with said revolver reading means, information reading transducing means positioned in operative relationship to the information tracks, means for selectively enabling the information reading transducing means, a control track on the member containing spaced criterion marks, control reading transducing means in operative relation to said control track, the control reading means being connected as an input to the selective enabling means for successively advancing the enabling means in response to the criterion marks in the control track, the successive enabling means including means for applying to the second input of the coincidence detector means the output of whichever one of the information reading transducing means is enabled to energize the coincidence detector to produce an output signal whenever coincidence is detected by the criterion locator information read from the revolver means and an identifying criterion read from one of the information tracks.

13. Apparatus as in claim 12 wherein the control reading transducing means and the respective information reading transducing means have a predetermined physical alignment in the direction of record movement, and wherein the information and criterion is recorded in the information tracks in physical alignment differing from the physical alignment of the information reading transducing means whereby a staggered relationship of identifying criterion in the information tracks is provided at spaced intervals in the direction of record movement corresponding to the spacing of the criterion marks in the control track, the arrangement being such that criterion marks in the control track will successively energize the information reading transducing means from track to track to search said criterion portions of the information sections without scanning the remainder of the information sections.

14. A record member having recorded thereon along a plurality of parallel information tracks a plurality of sections of information data in each of said tracks including criterion data recorded in each section serially with respect to the remainder of the information data of each section and in the same form for detection, and criterion marks recorded in a further track, the criterion marks being positionally related to said criterion data of each of the information sections with the respective ends of each section being in a staggered relationship to each other.

References Cited in the file of this patent

UNITED STATES PATENTS

| | | |
|---|---|---|
| 2,124,906 | Bryce | July 26, 1938 |
| 2,549,071 | Dusek | Apr. 17, 1951 |
| 2,614,169 | Cohen | Oct. 14, 1952 |
| 2,675,427 | Newby | Apr. 13, 1954 |
| 2,718,356 | Burrell et al. | Sept. 20, 1955 |
| 2,721,990 | McNaney | Oct. 25, 1955 |

OTHER REFERENCES

"24-Digit Parallel Computer With Magnetic Drum Memory," published by Engineering Research Associates, Inc., Feb. 15, 1949 (pp. 27–30 and Figs. 3.3–4 through 3.3–11 relied upon).

UNITED STATES PATENT OFFICE
CERTIFICATION OF CORRECTION

January 24, 1961

Patent No. 2,969,525

John L. Hill

It is hereby certified that error appears in the above numbered patent requiring correction and that the said Letters Patent should read as corrected below.

In the grant, lines 2 and 3, for "assignor to Remington Rand Inc., of New York, N. Y., a corporation of Delaware," read -- assignor, by mesne assignments, to Sperry Rand Corporation, of New York, N. Y., a corporation of Delaware, --; line 12, for "Remington Rand Inc., its successors" read -- Sperry Rand Corporation, its successors --; in the heading to the printed specification, lines 3, 4, and 5, for "assignor to Remington Rand Inc., New York, N. Y., a corporation of Delaware" read -- assignor, by mesne assignments, to Sperry Rand Corporation, New York, N. Y., a corporation of Delaware --.

Signed and sealed this 7th day of November 1961.

(SEAL)
Attest:

ERNEST W. SWIDER
Attesting Officer

DAVID L. LADD
Commissioner of Patents